United States Patent [19]

Maitland et al.

[11] Patent Number: 4,907,242
[45] Date of Patent: Mar. 6, 1990

[54] GAS LASER APPARATUS HAVING A LOW PRESSURE BUFFER GAS

[75] Inventors: Arthur Maitland, St. Andrews, Scotland; Clifford R. Weatherup, Chelmsford, United Kingdom

[73] Assignee: EEV Limited, Chelmsford, Great Britain

[21] Appl. No.: 255,280

[22] Filed: Oct. 11, 1988

[30] Foreign Application Priority Data

Oct. 10, 1987 [GB] United Kingdom ............... 8723872

[51] Int. Cl.$^4$ ............................................... H01S 3/097
[52] U.S. Cl. ........................................ 372/88; 372/56; 372/61
[58] Field of Search ................ 372/88, 87, 56, 61, 372/78, 82, 34, 35

[56] References Cited

U.S. PATENT DOCUMENTS

| Re. 27,282 | 2/1968 | Kolb | 372/87 |
|---|---|---|---|
| 3,878,479 | 4/1975 | Heising | 372/56 |
| 3,970,956 | 7/1976 | Bolduc | 372/87 |
| 4,021,845 | 5/1977 | Wang | 372/88 |
| 4,184,127 | 1/1980 | Green et al. | 372/32 |
| 4,193,042 | 3/1980 | Wang | 372/56 |
| 4,210,876 | 7/1980 | Ogata | 372/56 |
| 4,593,397 | 6/1986 | Proud et al. | 372/87 |
| 4,641,316 | 2/1987 | Collins et al. | 372/87 |
| 4,710,942 | 12/1987 | Howard | 372/87 |

FOREIGN PATENT DOCUMENTS

| 0009965 | 4/1980 | European Pat. Off. | |
|---|---|---|---|
| 0097878 | 5/1986 | Japan | 372/56 |
| 0101092 | 5/1987 | Japan | 372/87 |
| 1520935 | 8/1978 | United Kingdom . | |
| 2079523 | 1/1982 | United Kingdom . | |

OTHER PUBLICATIONS

Lorincz, E., et al., "The Effect of Substituting Metal Vapour with Metal Halide Vapour in a Hollow Cathode Laser Discharge", *Applied Physics*, vol. 21, No. 1, Jan. 1980, pp. 25-28.

Kim, J. J. et al., "Transverse-Discharge Copper-Vapor Laser", *IEEE Journal of Quantum Electronics*, vol. QE-21, No. 11, Nov. 1985, pp. 1747-1748.

Piper, J. A. et al., "A Hollow Cathode Device for CW Helium-Metal Vapour Laser Systems," *Journal of Physics D; Applied Physics*, vol. 6, No. 4, Feb. 1973, pp. 400-407.

Iijima, T., "Simplified High Voltage Hollow Cathode Discharge Tube for Excitation Source of Metal Vapor Lasers," *Japanese Journal of Applied Physics*, vol. 21, No. 9, Part 2, Sep. 1982, pp. 4597-4598.

Browne, P. G. et al., "Metastable Densities and Excitation Processes in the He-CD Laser Discharge," *Journal of Physics B (Atomic and Molecular Physics)*, vol. 6, No. 6, Jun. 1973, pp. 1103-1117.

Huchital et al; "Argon Laser . . . Hollow Cathode Discharge"; IEEE Journal of Quantum Electronics, vol. QE-3, No. 9; 09/67.

Kawa; "Quasi-Metastable . . . Laser"; Japan J. Appl. Phys., vol. 17, No. 2; 1978.

Brunet et al; "Production . . . A Hollow Cathode Arc"; 5th International Conference on Gas Discharges, Liverpool, England, 09/78.

Grace et al; "Design . . . Hollow Cathode He-Cd+ Laser"; J. Phys. D: Appl. Phys., vol. 12; 1979; pp. 2043-2051.

*Primary Examiner*—Frank Gonzalez
*Attorney, Agent, or Firm*—Spencer & Frank

[57] ABSTRACT

Laser apparatus including a relatively long cylindrical cathode within a discharge tube containing a buffer gas at a low pressure of less than 1 Torr. By employing a laser constructed according to the invention, it is possible to achieve a plasma which extends along the length of the cathode, which may be up to one meter long.

8 Claims, 1 Drawing Sheet

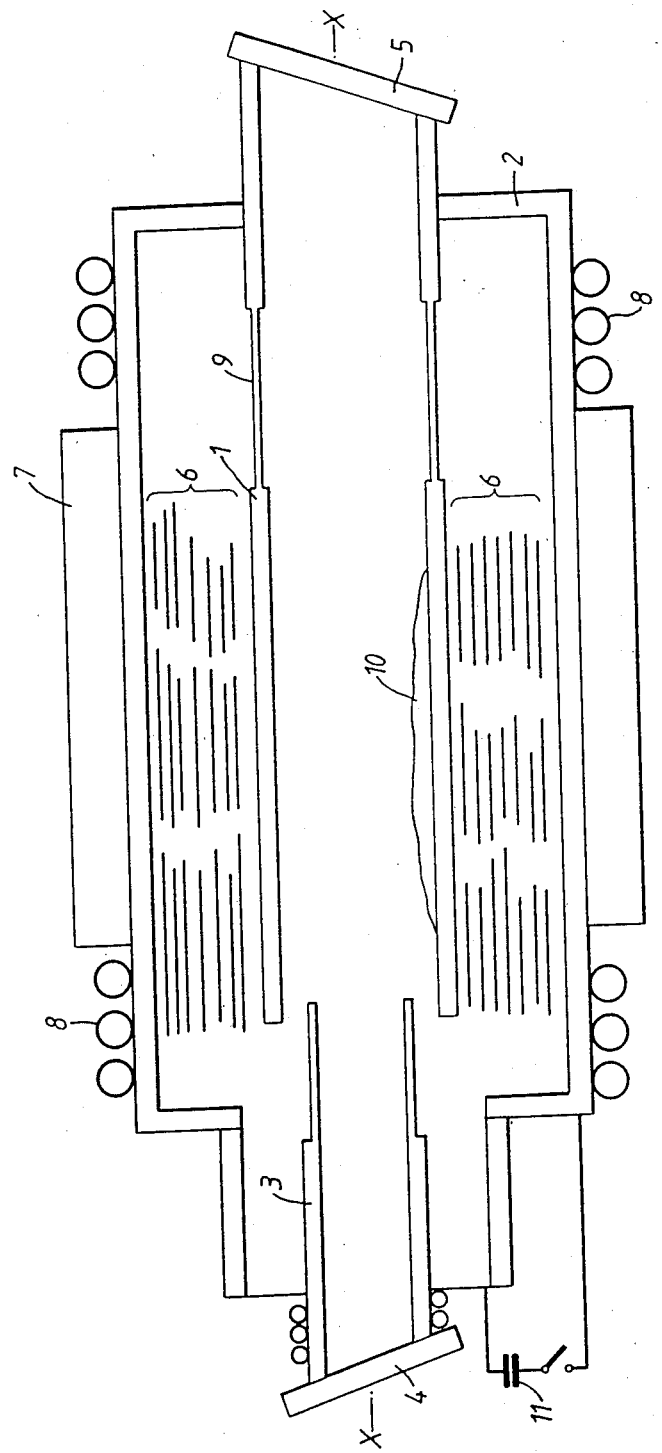

GAS LASER APPARATUS HAVING A LOW PRESSURE BUFFER GAS

FIELD OF THE INVENTION

This invention relates to laser apparatus and more particularly to laser apparatus in which the amplifying medium comprises a metal vapour.

BACKGROUND OF THE INVENTION

One of the determining factors of the power output of a laser is the volume of the amplifying medium. The maximum volume which can be used is constrained by electrical considerations and by the geometry of the containing discharge tube.

The present invention seeks to provide a laser apparatus in which a relatively high power output may be achieved.

SUMMARY OF THE INVENTION

According to the invention there is provided a laser apparatus comprising: a laser discharge tube contanining low pressure buffer gas and a cylindrical cathode within which a plasma is established during operation. By low pressure it is meant that the buffer gas is at less than 1 torr. By employing the invention, it is possible to arrange that the plasma within the discharge tube extends over substantially the entire length of the tube,- which may be up to one metre, depending on the tube diameter. This is because the low pressure buffer gas enables the discharge to be established over a much longer length than is possible with a conventional laser apparatus. The buffer gas may be hydrogen, deuterium, an inert gas or a mixture of these, for example. The invention is particularly advantageously applied with the laser amplifying medium is a metal vapour, such as copper or gold. A suitable material for the cathode is molybdenum and preferably radiation shielding is provided around it.

Advantageously, heating is applied to the central portion of the cathode and cooling to the end portions.

BRIEF DESCRIPTION OF THE DRAWING

One way in which the invention may be performed is now described by way of example with reference to the accompanying drawing, in which THE SOLE FIGURE schematically illustrates a laser apparatus in accordance with the invention.

DESCRIPTION OF THE PREFERRED EMBODIMENT

With reference to the FIGURE, laser apparatus includes a cylindrical molybdenum cathode 1 located within a discharge tube 2. A cylindrical anode 3 is located at one end of the tube 2 and is arranged coaxially and within the cathode 1, overlapping its end. The anode 3 and cathode 1 are arranged about the optical axis X—X of the laser and windows 4 and 5 are provided at each end. Radiation shielding 6 is provided about the cathode 1 and comprises a plurality of coaxial cylindrical metal members. An oven 7 is arranged around the outer surface of the discharge tube 2 and is co-extensive with the central region of the cathode 1. Water cooling 8 is provided at each side of the oven 7 to cool the ends of the cathode 1. Thus, during operation of the apparatus, the central section may be kept at a relatively high temperature and the end sections cooled. The cathode 1 includes a portion 9 of reduced wall thickness at the end remote from the anode 3. This acts as a thermal choke to reduce the heat transmitted to the end of the tube 2. Powdered copper 10 is located within the cathode 1 and a buffer gas of low pressure hydrogen at less than 1 torr is contained within the envelope 2.

When it is wished to operate the laser, a capacitor 11 is switched to cause a discharge to be established between the cathode 1 and anode 3. The resulting plasma extends substantially entirely along the length of the cathode 1, causing the copper powder 10 to vaporise. The resulting amplifying medium extends over the length of the cathode 1, giving a high power output.

We claim:

1. A discharge tube for a laser apparatus having a resonant cavity, said discharge tube having an optical axis and including an anode positioned within said tube along said optical axis; a cylindrical hollow cathode having an end adjacent said anode, an opposite end, and a wall; and a material contained within said tube for forming a laser amplifying medium during operation of said laser apparatus, wherein the improvement comprises a buffer gas contained within said discharge tube at a pressure of less than one Torr, a plasma being established within said cylindrical hollow cathode during operation of said laser apparatus.

2. A discharge tube as claimed in claim 1 wherein said laser amplifying medium is a metal vapour.

3. A discharge tube as claimed in claim 1 wherein said buffer gas is hydrogen, deuterium or an inert gas, or a mixture of two or more of these gases.

4. A discharge tube as claimed in claim 3 wherein said laser amplifying medium is a metal vapour.

5. A discharge tube as claimed in claim 1 and including radiation shielding within said tube, said shielding being spaced from and substantially surrounding said cylindrical cathode.

6. A discharge tube as claimed in claim 1, which further comprises means for heating said cathode at its centre along said optical axis and cooling the ends thereof.

7. A discharge tube as claimed in claim 1, wherein said anode is cylindrical and is arranged co-axially with said cathode, a part of said anode lying within and overlapping part of said cathode.

8. A discharge tube as claimed in claim 7, wherein the wall of said cathode is thinner at its end remote from said anode than at its end nearest said anode.

* * * * *